(12) United States Patent
Liu et al.

(10) Patent No.: US 12,105,014 B2
(45) Date of Patent: Oct. 1, 2024

(54) TESTING APPARATUS FOR THRUST OF HYDRATE

(71) Applicant: CHINA UNIVERSITY OF PETROLEUM, Shandong (CN)

(72) Inventors: Chenwei Liu, Shandong (CN); Zhiyuan Wang, Shandong (CN); Yongfei Mi, Shandong (CN); Ci Yan, Shandong (CN)

(73) Assignee: CHINA UNIVERSITY OF PETROLEUM, Shandong (CN)

( * ) Notice: Subject to any disclaimer, the term of this patent is extended or adjusted under 35 U.S.C. 154(b) by 340 days.

(21) Appl. No.: 17/582,946

(22) Filed: Jan. 24, 2022

(65) Prior Publication Data

US 2022/0146407 A1    May 12, 2022

Related U.S. Application Data

(63) Continuation of application No. PCT/CN2020/103378, filed on Jul. 22, 2020.

(30) Foreign Application Priority Data

Jul. 22, 2019    (CN) .......................... 201910663293.4

(51) Int. Cl.
*G01N 19/04*    (2006.01)
*G01L 19/00*    (2006.01)
(Continued)

(52) U.S. Cl.
CPC .......... *G01N 19/04* (2013.01); *G01L 19/0092* (2013.01); *G01N 1/34* (2013.01);
(Continued)

(58) Field of Classification Search
None
See application file for complete search history.

(56) References Cited

U.S. PATENT DOCUMENTS

2012/0082590 A1*   4/2012   Lee .......................... B01J 3/006
                                                                  422/119
2013/0143248 A1   6/2013   Fernandez et al.

FOREIGN PATENT DOCUMENTS

CN    201583630 U    9/2010
CN    101982928 A    3/2011
(Continued)

OTHER PUBLICATIONS

Sun Baojiang et al., Research Development and Outlook for Managed Pressure Cementing Technology, Petroleum Drilling Techniques, May 2019, p. 56-61, vol. 47 No. 3.
(Continued)

*Primary Examiner* — Brandi N Hopkins
*Assistant Examiner* — Nigel H Plumb
(74) *Attorney, Agent, or Firm* — IP & T GROUP LLP (57) ABSTRACT

The present disclosure provides a mechanical property detection device and a force detection system, and relates to the technical field of hydrate experiment equipment. The mechanical property detection device includes a reaction kettle, a thrust mechanism, and a force detection sensor; a reaction platform and a reaction frame provided on the reaction platform are provided in the reaction kettle, an end of the thrust mechanism extends into the reaction kettle, and can push the reaction frame to move relative to the reaction platform, and the force detection sensor is configured to detect magnitude of a thrust of the thrust mechanism when pushing the reaction frame, so as to solve the technical problems such as inconvenience in testing an adhesive force of gas hydrate in the prior art.

18 Claims, 2 Drawing Sheets

(51) Int. Cl.
    *G01N 1/34*     (2006.01)
    *G01N 1/42*     (2006.01)
    *G02B 21/06*     (2006.01)
    *G02B 21/36*     (2006.01)

(52) U.S. Cl.
    CPC ............... *G01N 1/42* (2013.01); *G02B 21/06* (2013.01); *G02B 21/362* (2013.01)

(56) References Cited

FOREIGN PATENT DOCUMENTS

| | | | |
|---|---|---|---|
| CN | 102087204 | A | 6/2011 |
| CN | 103884778 | A | 6/2014 |
| CN | 104913960 | A | 9/2015 |
| CN | 205166358 | U | 4/2016 |
| CN | 106466586 | A | 3/2017 |
| CN | 206362687 | U | 7/2017 |
| CN | 107024428 | * | 8/2017 |
| CN | 107024428 | A | 8/2017 |
| CN | 206684017 | U | 11/2017 |
| CN | 108130146 | A | 6/2018 |
| CN | 207573169 | U | 7/2018 |
| CN | 108535180 | A | 9/2018 |
| CN | 108827839 | A | 11/2018 |
| CN | 109204270 | A | 1/2019 |
| CN | 109323986 | A | 2/2019 |
| CN | 109668891 | A | 4/2019 |
| CN | 208887818 | U | 5/2019 |
| CN | 109968605 | A | 7/2019 |
| CN | 110346285 | A | 10/2019 |
| WO | 2016/065073 | A1 | 4/2016 |

OTHER PUBLICATIONS

Wei Hongshu et al., The Ascending Law of Gas Bubbles in a Wellbore Considering the Phase Change of Natural Gas Hydrates during Deepwater Well Shut-in, Petroleum Drilling Techniques, Mar. 2019, p. 42-49, vol. 47 No. 2.

The First Office Action of Priority Application No. CN 201910663293.4 issued by the Chinese Patent Office on Mar. 3, 2021.

Notification to Grant Patent Right for Invention of Priority Application No. CN 201910663293.4 issued by the Chinese Patent Office on Aug. 25, 2021.

International Search Report of International Application No. PCT/CN2020/103378 issued by the Chinese Patent Office on Oct. 26, 2020.

Written Opinion of International Application No. PCT/CN2020/103378 issued by the Chinese Patent Office on Oct. 26, 2020.

* cited by examiner

TESTING APPARATUS FOR THRUST OF HYDRATE

CROSS-REFERENCE TO RELATED APPLICATION

This application is a Bypass Continuation-in-Part Application of PCT/CN2020/103378 filed on Jul. 22, 2020, which claims the priority to the Chinese patent application with the filing No. 201910663293.4 filed on Jul. 22, 2019 with the Chinese Patent Office, and entitled "Mechanical Property Detection Device and Use Method thereof and Force Detection System", the contents of which are incorporated herein by reference in entirety.

TECHNICAL FIELD

The present disclosure relates to the technical field of hydrate experiment equipment, particularly to a mechanical property detection device and a force detection system.

BACKGROUND ART

Gas hydrates are non-stoichiometric clathrate crystals generated from gas molecules and water molecules under certain temperature and pressure conditions. During the exploitation process of deep-water oil and gas field, due to the high pressure and low temperature environmental characteristics of the deep water and ultra-deep water regions, light hydrocarbon components in the oil and gas gathering and transporting pipelines easily generate natural gas hydrates with water, and the generated hydrates will adhere to the walls of the pipelines, and further gradually accumulate to cause blockage of the gathering and transporting pipelines, and affect normal transportation of the oil and gas in the pipelines. Field statistics show that, compared with conventional problems such as pipeline colloid, asphaltene deposition, scaling, and corrosion, due to the characteristics such as rapid development, difficulty in cleaning, and high safety risk, the hydrate blockage has become one of the main problems faced with flow assurance of the current deep-water oil and gas technology.

In the prior art, due to the restriction of the high pressure and low temperature conditions, the study of the mechanical properties of the hydrates is affected to a certain extent.

Information disclosed in the part of Background Art merely aims at deepening understanding to the overall background art of the present disclosure, but should not be regarded as acknowledging or implying in any form that the information constitutes prior art generally known by a person skilled in the art.

SUMMARY

The present disclosure provides a mechanical property detection device, so that at least one of the technical problems such as inconvenient testing of gas hydrate adhesion in the prior art can be solved.

In order to achieve the above objective, the present disclosure adopts the following technical solutions.

A mechanical property detection device provided in the present disclosure includes a reaction kettle, a thrust (pushing force) mechanism, and a force detection sensor,
wherein a reaction platform and a reaction frame provided on the reaction platform may be provided in the reaction kettle, an end of the thrust mechanism may extend into the reaction kettle, and can push the reaction frame to move relative to the reaction platform; and the force detection sensor may be configured to detect magnitude of a thrust of the thrust mechanism when pushing the reaction frame.

Optionally, the reaction kettle may include a cylindrical side wall, a lower cover covering a lower end of the cylindrical side wall, and an upper cover covering an upper end of the cylindrical side wall, and the reaction platform is fixedly provided in an inner cavity of the reaction kettle.

Optionally, the thrust mechanism may include a drive assembly, a push rod, and a push plate fixedly connected to the push rod; and the force detection sensor may be provided on the push rod, and a power output end of the drive assembly is connected to the push rod, so as to push the push rod to move, the push rod drives the push plate to move synchronously, and a side of the push plate away from the push rod can abut against the reaction frame.

Optionally, the drive assembly may include a hand wheel, a screw rod, and a fixing block sleeved on the screw rod;
an end of the push rod away from the push plate may be fixedly connected to the fixing block, and the hand wheel may be fixedly connected to an end of the screw rod away from the push rod; and
the screw rod can be driven to rotate in synchronization by rotating the hand wheel, so that the fixing block can reciprocate along a length direction of the screw rod.

Optionally, a blind hole may be provided at an end of the push rod facing the screw rod, and when the push rod moves towards an end close to the screw rod, an end portion of the screw rod may extend into the blind hole.

Optionally, the drive assembly further may include a positioning rod and a positioning plate; and
an end of the positioning rod may be fixedly connected to the reaction kettle, the positioning rod may be slidingly fitted with the positioning plate, and the fixing block is fixedly provided on the positioning plate.

Optionally, one side surface of the positioning plate facing the hand wheel may be fixedly connected to an end surface of the fixing block, and the push rod may be fixedly connected to the other side surface of the positioning plate.

Optionally, the positioning rod may be provided in parallel with the screw rod, and when the positioning plate is quadrangular, four positioning rods may be provided, and the four positioning rods may be respectively connected to four corners of the positioning plate.

Optionally, the fixing block may be provided in a step shape, and
an end of the push rod connected to the positioning plate may be provided in a step shape.

Optionally, the drive assembly further may include a fixing plate,
wherein the fixing plate and the positioning plate may be parallel to each other, and the other end of the positioning rod may be fixedly connected to the fixing plate, and the screw rod passes through the fixing plate and is rotatably connected to the fixing plate.

Optionally, at least one reaction frame may be provided, the push plate may have at least one push portion, and each reaction frame may be corresponding to one push portion.

Optionally, a plurality of reaction frames may be provided on the reaction platform, the plurality of reaction frames may be arranged in a step shape along a length direction of the reaction platform, and a plurality of step-shaped push portions are arranged on the side surface of the push plate facing the reaction frames, wherein each push portion is corresponding to one reaction frame, and an interval (spacing) between any two adjacent push portions is greater than length or width of a single reaction frame.

Optionally, the reaction kettle may have a visual window configured to observe the reaction frame, and a glass plate may be provided at the visual window.

Optionally, the reaction kettle may have an injection port configured to fill a gas.

Optionally, the reaction kettle may have an interlayer cavity, the interlayer cavity may have a circulating liquid inlet and a circulating liquid outlet, the circulating liquid inlet and the circulating liquid outlet may be respectively connected to a circulating liquid conduit, and the circulating liquid conduit may be configured to communicate with a refrigerator.

Optionally, the mechanical property detection device further may include a pressure sensor configured to detect a pressure within the reaction kettle, wherein the pressure sensor may be provided on an inner bottom surface of the reaction kettle; and the mechanical property detection device further may include a temperature sensor configured to detect a temperature within the reaction kettle, wherein the temperature sensor may be provided on an inner side wall of the reaction kettle.

Optionally, the pressure sensor and the temperature sensor may be respectively connected to a detection secondary instrument, and the detection secondary instrument may be configured to be electrically connected to an external computer.

Optionally, the injection port may be provided on the upper cover, and is arranged to penetrate in a thickness direction of the upper cover, the injection port is connected to a ventilation pipeline, and the other end of the ventilation pipeline may be connected to an external gas cylinder (gas bottle).

The present disclosure provides a force detection system, so as to be capable of at least solving one of the technical problems in the prior art, such as inconvenience in testing an adhesive force of gas hydrate and inconvenience in observation.

The present disclosure further provides a force detection system, which may include the above mechanical property detection device, and further may include a microscopic observation system;

an observation port of the microscopic observation system faces the visual window of the reaction kettle, so as to observe changes of hydrate in the reaction kettle.

Optionally, the microscope system may include: a computer, a CCD image sensor, a zoom lens (continuous zoom lens), an LED intense light source, and a light source control box, wherein the CCD image sensor is connected to the zoom lens, the other end of the image sensor is connected to the computer through a data line, and is configured to observe growth morphology of gas hydrate, and the LED intense light source is fixed at a front end of the zoom lens, and is configured to provide a light source for the reaction kettle.

The present disclosure provides a use method based on the mechanical property detection device, which may include following steps:

preparation work: cleaning the reaction platform and the reaction frame inside the reaction kettle several times with distilled water, after the cleaning is completed and moisture is evaporated, connecting pipelines, sealing the reaction kettle, and after introducing methane gas, inspecting the pipelines for airtightness;

temperature adjustment work: injecting a circulating liquid into a thermotank of a refrigerator, starting the refrigerator, and adjusting temperature of the refrigerator to −5° C.;

adding material: after the temperature in the reaction kettle reaches experimental requirements, adding a certain volume of distilled water to the reaction frame, and then sealing the reaction kettle;

pressure adjustment work: filling methane gas into the reaction kettle, and when pressure in the reaction kettle reaches 5 MPa, closing an inflation valve and opening an exhaust valve to reduce the pressure to atmospheric pressure; then closing the exhaust valve and opening the inflation valve to increase the pressure to pressure condition required in the experiment;

temperature rising work: increasing the temperature in the reaction kettle at a heating rate of 1° C./min until the temperature reaches a temperature required for the experiment;

observation work: making observation through a microscope system in real time, and recording growth morphology of hydrate;

test work: after experiment time reaches set time, testing an adhesive force value of the hydrate by a force measuring mechanism and recoding the adhesive force value; and repeating the above steps several times to obtain the adhesive force obtained under the same condition, wherein an average value is a final adhesive force of the hydrate on a wall surface.

Beneficial effects of the present disclosure include:

The mechanical property detection device provided in the present disclosure includes the reaction kettle and the thrust mechanism. In the above, the reaction platform and the reaction frame are provided in the reaction kettle, the reaction frame is mounted on the reaction platform, the gas hydrate is placed in the reaction frame, and the gas hydrate can condense between the reaction frame and the reaction platform over time. In the process of practical detection, the thrust mechanism pushes the reaction frame to move relative to the reaction platform, and prompts the reaction frame to push the condensed gas hydrate to move in the same direction; meanwhile, the condensed gas hydrate can apply an opposite acting force to the thrust mechanism. The force detection sensor is configured to detect the magnitude of force applied by the thrust mechanism.

The mechanical property detection device pushes, through the thrust mechanism, the reaction frame to move relative to the reaction platform, and further pushes the gas hydrate to move. The magnitude of thrust applied by the thrust mechanism to the reaction frame is tested by the force detection sensor, further the magnitude of adhesive force of the gas hydrate adhering to the reaction platform during the pushing process is obtained, thus testing of adhesive force of the gas hydrate is realized.

The force detection system provided by the present embodiment may include the above mechanical property detection device, and further may include a microscopic observation system, thus, changes of gas hydrate in the reaction kettle can be directly observed through the microscopic observation system, realizing the visualization of the operation of testing the adhesive force.

It should be noted that that the structure of the mechanical property detection device and the beneficial effects produced have been illustrated in detail in the above, and will not be repeated redundantly herein.

BRIEF DESCRIPTION OF DRAWINGS

In order to more clearly illustrate technical solutions in specific embodiments of the present disclosure or the prior art, accompanying drawings which need to be used in the description of the specific embodiments or the prior art will be introduced briefly below. Apparently, the accompanying drawings in the description below merely show some embodiments of the present disclosure, and those ordinarily skilled in the art still could obtain other accompanying drawings in light of these accompanying drawings, without using creative efforts.

REFERENCE SIGNS

10—reaction kettle; 11—reaction platform; 12—reaction frame; 13—upper cover; 14—glass plate; 20—thrust mechanism; 21—force detection sensor; 22—push rod; 23—push plate; 24—hand wheel; 25—screw rod; 26—fixing block; 27—positioning rod; 28—positioning plate; 29—fixing plate; 231—push portion; 31—refrigerator; 32—circulating liquid conduit; 40—gas cylinder; 50—computer; 60—detection secondary instrument; 100—mechanical property detection device; 131—visual window; 132—injection port; 200—microscope system.

DETAILED DESCRIPTION OF EMBODIMENTS

Technical solutions of the present disclosure will be described below clearly and completely in connection with accompanying drawings. Apparently, the embodiments described are only some but not all embodiments of the present disclosure. All of other embodiments obtained by those ordinarily skilled in the art based on the embodiments in the present disclosure without using creative efforts shall fall within the scope of protection of the present disclosure.

In the description of the present disclosure, it should be noted that terms such as "first" and "second" are merely for descriptive purpose, but should not be construed as indicating or implying importance in the relativity.

In the description of the present disclosure, it should be illustrated that, unless otherwise specifically regulated and defined, the terms "install", "link", and "connect" should be understood in a broad sense, for example, a connection may be a fixed connection, a detachable connection, or an integrated connection; it may be a mechanical connection or an electrical connection; it may be direct joining or indirect joining through an intermediary, and it also may be inner communication between two elements. For those ordinarily skilled in the art, specific meanings of the above-mentioned terms in the present disclosure could be understood according to specific circumstances.

It should be noted that free water on a wall surface will generate solid-phase natural gas hydrates under proper conditions, and the solid-phase natural gas hydrates are adhered to a surface of a pipeline wall, so that a flow section becomes smaller, and normal transmission of oil and gas is seriously affected; to acquire the adhesive force of the hydrates to the pipeline wall, on one hand, can provide basic data for blockage risk assessment of the hydrates, and on the other hand, can be used to evaluate the action effect of an inhibitor, and guide the screening of a hydrate inhibitor. However, in the prior art, due to the restriction of high pressure and low temperature conditions, the research on the mechanical properties of the hydrates is affected to a certain extent.

In view of this, there is an urgent need for a mechanical property detection device and a force detection system that can solve the above problems.

Figure 1:
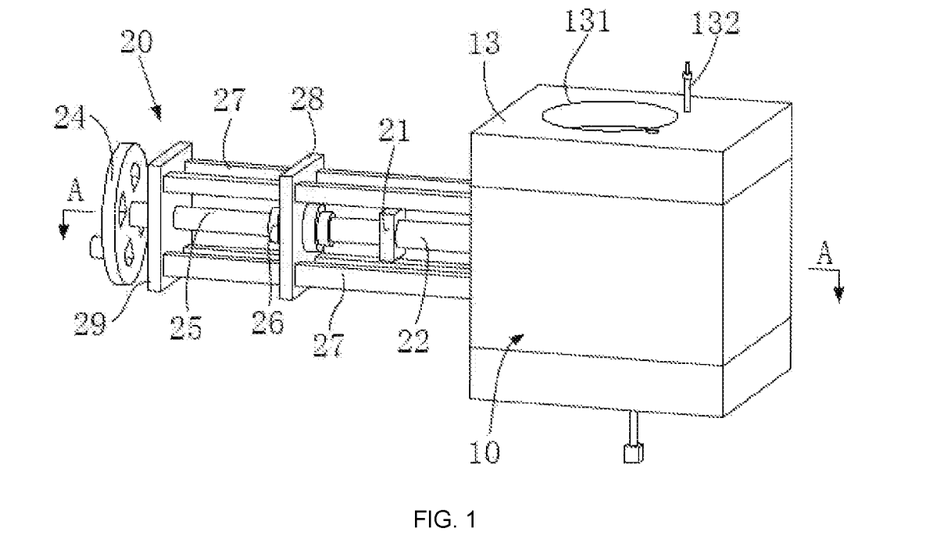
FIG. 1 is a schematic view of a reaction kettle and a thrust mechanism provided in an embodiment of the present disclosure.
Figure 2:
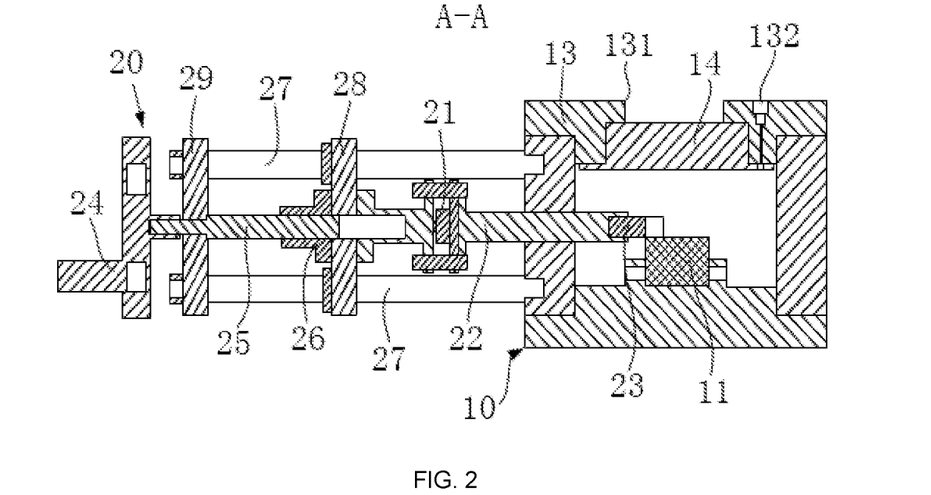
FIG. 2 is a sectional view along A-A in FIG. 1.
Figure 3:
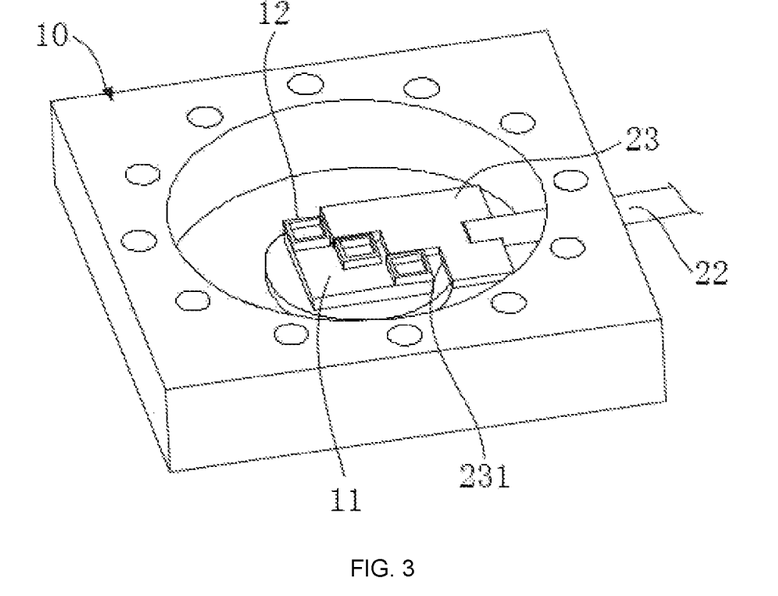
FIG. 3 is a schematic view of the reaction kettle provided in an embodiment of the present disclosure.

As shown in FIG. 1 to FIG. 3, the mechanical property detection device provided by the present embodiment may include a reaction kettle 10, a thrust mechanism 20, and a force detection sensor 21. A reaction platform 11 and a reaction frame 12 provided on the reaction platform 11 may be provided in the reaction kettle 10, an end of the thrust mechanism 20 extends into the reaction kettle 10 and can push the reaction frame 12 to move relative to the reaction platform 11, and the force detection sensor 21 may be configured to detect magnitude of a thrust of the thrust mechanism 20 when pushing the reaction frame 12.

Specifically, the reaction kettle 10 may include a cylindrical side wall, a lower cover covering a lower end of the cylindrical side wall, and an upper cover 13 covering an upper end of the cylindrical side wall, the reaction platform 11 may be fixedly provided in an inner cavity of the reaction kettle 10, and the reaction frame 12 may be provided on the reaction platform 11. In the above, the reaction platform 11 may be made of a metal block, and the reaction frame 12 may be made of a quartz frame. In the above, an end of the thrust mechanism 20 extends through the cylindrical side wall of the reaction kettle 10 into the inner cavity of the reaction kettle 10, and can act on the reaction frame 12, the force detection sensor 21 may be fixedly provided on the thrust mechanism 20, and when the thrust mechanism 20 applies a thrust to the reaction frame 12, the force detection sensor 21 can test the magnitude of the applied thrust in real time.

In practical use, a substance placed in the reaction frame 12 may be a gas hydrate, and the gas hydrate can condense and aggregate in the reaction frame 12, and further adheres between the reaction frame 12 and the reaction platform 11. When the thrust mechanism 20 pushes the reaction frame 12 to move relative to the reaction platform 11, the adhesive force of the gas hydrate acting on the reaction frame 12 and the reaction platform 11 serves as a resistance impeding the movement of the reaction frame 12, that is, a reaction force to the thrust applied by the thrust mechanism 20.

The mechanical property detection device provided by the present embodiment pushes, through the thrust mechanism 20, the reaction frame 12 to move relative to the reaction platform 11, and further pushes the gas hydrate condensed and aggregated in the reaction frame 12 to move. The magnitude of thrust applied by the thrust mechanism 20 to the reaction frame 12 is tested by the force detection sensor 21, further the magnitude of adhesive force of the gas hydrate adhering to the reaction platform 11 during the pushing process is obtained, thus testing of adhesive force of the gas hydrate is realized.

With continued reference to FIG. 1 and FIG. 2, optionally, the thrust mechanism 20 may include a drive assembly, a push rod 22, and a push plate 23 fixedly connected to the push rod 22; the force detection sensor 21 is provided on the push rod 22, and a power output end of the drive assembly is connected to the push rod 22, so as to push the push rod 22 to move, the push rod 22 drives the push plate 23 to move synchronously, and a side of the push plate 23 away from the push rod 22 can abut against the reaction frame 12.

Specifically, the power output end of the drive assembly may be connected to the push rod 22, so that the power generated by the drive assembly is transmitted to the push rod 22. An end of the push rod 22 away from the drive assembly may be fixedly connected to the push plate 23, so that the push plate 23 can directly act on the reaction frame 12, i.e. by driving the push rod 22 to move by the drive assembly, the push rod 22 drives the push plate 23 to push the reaction frame 12, and further the movement of the reaction frame 12 relative to the reaction platform 11 is realized.

Optionally, the drive assembly may be an electric drive assembly or a manual drive assembly, and when the drive assembly is an electric drive assembly, the drive assembly in this case may adopt a hydraulic cylinder, an gas cylinder, a stepping motor, or the like, and when the manual drive assembly is adopted, a manual rotating wheel or the like may be adopted.

With continued reference to FIG. 1 and FIG. 2, optionally, the drive assembly includes a hand wheel 24, a screw rod 25, and a fixing block 26 slidingly fitted with the screw rod 25; an end of the push rod 22 away from the push plate 23 is fixedly connected to the fixing block 26, the hand wheel 24 is fixedly connected to an end of the screw rod 25 away from the push rod 22, the screw rod 25 is driven to rotate by rotating the hand wheel 24, and the fixing block 26 drives the push rod 22 to move relative to the screw rod 25.

Optionally, the drive assembly adopts the screw rod 25 to achieve transmission. An end of the screw rod 25 is connected to the hand wheel 24, the other end of the screw rod 25 is slidingly fitted with the fixing block 26, and an end of the push rod 22 away from the push plate 23 is fixedly connected to the fixing block 26. In a specific process, when the hand wheel 24 is rotated to drive the screw rod 25 to rotate in a circumferential direction thereof, the rotation of the screw rod 25 in this case can drive the fixing block 26 to move along a length direction of the screw rod 25, and further drive the push rod 22 to move synchronously by the movement of the fixing block 26.

Optionally, a blind hole may be provided at an end of the push rod 22 facing the screw rod 25, and when the push rod 22 moves towards an end close to the screw rod 25, an end portion of the screw rod 25 can extend into the blind hole.

In the above, movement may be transmitted between the fixing block 26 and the screw rod 25 through thread engagement.

With continued reference to FIG. 1 and FIG. 2, in actual use, the drive assembly further may include a positioning rod 27 and a positioning plate 28; an end of the positioning rod 27 may be fixedly connected to the reaction kettle 10, the positioning rod 27 may be slidingly fitted with the positioning plate 28, and the fixing block 26 may be fixedly provided on the positioning plate 28.

Specifically, one side surface of the positioning plate 28 facing the hand wheel 24 may be fixedly connected to an end surface of the fixing block 26, and the push rod 22 may be fixedly connected to the other side surface of the positioning plate 28, further realizing the fixed connection of the fixing block 26, the positioning plate 28, and the push rod 22. In the above, the positioning plate 28 and the fixing block 26 can be connected in a variety of ways, for example, welding, plugging, riveting, or direct abutment; in addition, the positioning plate 28 and the push rod 22 may be connected in a variety of ways, for example, welding, plugging, riveting or direct abutment.

Optionally, the positioning rod 27 may be provided in pairs, and two positioning rods 27 in pairs may be respectively located in an upper portion and a lower portion of the positioning plate 28. In the above, the positioning rods 27 can pass through a top plate, and an extension end thereof is fixedly connected to a side wall of the reaction kettle 10, further ensuring the stability of the positioning rods 27, and the positioning plate 28 may be slidingly fitted with the positioning plate 28. When the fixing block 26 slides relative to the screw rod 25, the positioning plate 28 can also move synchronously relative to the positioning plate 28.

Optionally, the positioning rod 27 may be provided in parallel with the screw rod 25, and when the positioning plate 28 is quadrangular, four positioning rods 27 may be provided, and the four positioning rods 27 are respectively connected to four corners of the positioning plate 28.

In the above, the fixing block 26 may be provided in a step shape, and an end of the push rod 22 connected to the positioning plate 28 may also be provided in a step shape.

With continued reference to FIG. 1 and FIG. 2, optionally, the drive assembly further may include a fixing plate 29; the fixing plate 29 and the positioning plate 28 may be parallel to each other, and the other end of the positioning rod 27 may be fixedly connected to the fixing plate 29, and the screw rod 25 passes through the fixing plate 29 and may be rotatably connected to the fixing plate 29.

Specifically, the fixing plate 29 may be arranged in parallel with the positioning plate 28, and the fixing plate 29 can be fixedly provided at an end of the positioning rod 27 away from the reaction kettle 10, and further the fitting stability of the positioning rod 27 is ensured through the fixing action of the fixing plate 29 and the reaction kettle 10, so as to improve the stability of movement of the fixing block 26.

In the above, the screw rod 25 can pass through a middle part of the fixing plate 29 to be fixedly connected to the hand wheel 24, and the screw rod 25 can be rotatably connected to the fixing plate 29 through a bearing. The fixing plate 29 may also be arranged in a quadrangular shape, which is not limited herein.

With continued reference to FIG. 3, optionally, the number of reaction frames 12 is at least one, the push plate 23 has at least one push portion 231, and each reaction frame 12 corresponds to one push portion 231.

Specifically, when the number of reaction frame 12 is one, a side surface of the push plate 23 facing the reaction frame 12 is the push portion 231, and the push portion 231 abuts against a side wall of the reaction frame 12, so as to push the reaction frame 12 to move relative to the reaction platform 11.

When there are a plurality of reaction frames 12, a plurality of reaction frames 12 may be arranged in a step shape along a length direction of the reaction platform 11, and a plurality of step-shaped push portions 231 are arranged on the side surface of the push plate 23 facing the reaction frame 12, wherein each push portion 231 can correspond to one reaction frame 12, and an interval between any two adjacent push portions 231 is greater than the length or width of a single reaction frame 12. During practical use, a topmost push portion 231 preferentially abuts against a front-most reaction frame 12, so as to be capable of pushing the reaction frame 12 to move, in this case, the push portions 231 after the topmost push portion will not be in contact with the respective corresponding reaction frame 12. After the thrust of the topmost push portion 231 is measured, the next push portion 231 abuts against the corresponding reaction frame 12, so as to push the reaction frame 12 to move, and further a set of applied thrusts are measured. With the above structure, multiple sets of applied thrusts can be measured, and further a plurality of sets of test data of the adhesive force of the gas hydrate is obtained.

With continued reference to FIG. 2, optionally, the reaction kettle 10 may have a visual window 131 configured to observe the reaction frame 12, and a glass plate 14 may be provided at the visual window 131.

Specifically, an opening may be provided on the upper cover 13 of the reaction kettle 10, and the opening is just the visual window 131, that is, changes of the gas hydrate located in the reaction kettle 10 can be seen through the visual window 131. Optionally, the visual window 131 may be in a plurality of shapes, for example, a rectangular shape, a parallelogram shape, or a circular shape; the glass plate 14 is further fixedly disposed on the visual window 131, and the glass plate 14 is fixedly connected to the upper cover 13. Through the glass plate 14, it not only ensures that the reaction kettle 10 is in a sealed state, but also can simultaneously facilitate the observation of the movement inside the reaction kettle 10 by virtue of transparency of the glass plate 14.

With continued reference to FIG. 2, in practical use, the reaction kettle 10 may have an injection port 132 configured to fill a gas.

Specifically, the injection port 132 is provided on the upper cover 13, and the injection port 132 is arranged to penetrate in a thickness direction of the upper cover 13, the injection port 132 is connected to a ventilation pipeline, and the other end of the ventilation pipeline is connected to a gas cylinder 40, so that gas in the gas cylinder 40 can be filled into the reaction kettle 10 through the injection port 132 via the ventilation pipeline, so as to maintain a high pressure environment in the reaction kettle 10, and ensure the gas hydrate to be in a high pressure environment.

Optionally, the reaction kettle 10 may have an interlayer cavity, the interlayer cavity may have a circulating liquid inlet and a circulating liquid outlet, the circulating liquid inlet and the circulating liquid outlet are respectively connected to a circulating liquid conduit 32, and the circulating liquid conduit 32 is configured to communicate with a refrigerator 31.

In the present embodiment, a side wall of the reaction kettle 10 may have an interlayer cavity, that is, there is a space between an outer wall and an inner wall, and the space is just the interlayer cavity. The interlayer cavity may have the circulating liquid inlet and the circulating liquid outlet. The circulating liquid outlet is connected to a circulating liquid conduit 32. The other end of the circulating liquid conduit 32 is connected to an inlet of a thermotank in the refrigerator 31. The circulating liquid conduit 32 is also connected to the circulating liquid inlet, and the other end of the circulating liquid conduit 32 is connected to an outlet of the thermotank in the refrigerator 31, further, the circulating liquid in the thermotank flows to the interlayer cavity of the reaction kettle 10 along the circulating liquid conduit 32, and then flows from the interlayer cavity to the thermotank, so as to be refrigerated by a refrigeration element in the refrigerator 31, further, the stability of temperature inside the reaction kettle 10 is maintained by the flow of the circulating liquid.

In some embodiments, the mechanical property detection device further may include a pressure sensor configured to detect a pressure within the reaction kettle 10 and a temperature sensor configured to detect a temperature within the reaction kettle 10; the pressure sensor is provided on an inner bottom surface of the reaction kettle 10, and the temperature sensor is provided on an inner side wall of the reaction kettle 10.

Specifically, the pressure sensor and the temperature sensor may be respectively connected to a detection secondary instrument 60, and the detection secondary instrument 60 may be electrically connected to a computer 50, that is, detection data of the pressure sensor and the temperature sensor, after being processed and analyzed by the detection secondary instrument 60, can be converted into a numerical mode to be displayed on the computer 50, so as to facilitate observation and reading.

In the above, the detection secondary instrument 60 may have a pressure secondary instrument and a temperature secondary instrument, both with data output, facilitating subsequent software collection and analysis, and after the data is output, the pressure and temperature change condition in the reaction kettle 10 may be monitored in real time by data collection software.

Figure 4:
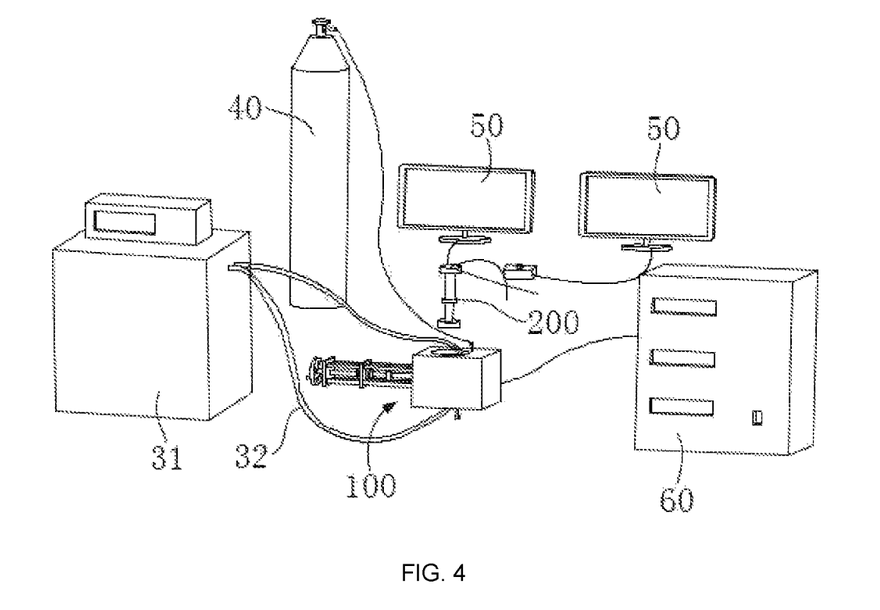
FIG. 4 is a schematic view of a force detection system provided in an embodiment of the present disclosure.

As shown in FIG. 4, the force detection system provided by the present embodiment may include the above mechanical property detection device 100, and further may include a microscope system 200; an observation port of the microscope system 200 may face the visual window 131, so as to observe changes of hydrate in the reaction kettle 10.

Specifically, the microscope system 200 may include a computer, a CCD image sensor (Charge-coupled Device), a zoom lens, an LED (Light Emitting Diode) intense light source, and a light source control box, wherein the CCD image sensor is connected to the zoom lens, the other end of the image sensor is connected to the computer through a data line, and configured to observe the growth morphology of the gas hydrate. A captured image may be presented on a computer screen in real time by the computer, and recorded and stored. The LED intense light source is fixed at a front end of the lens, and is configured to provide a light source for the reaction kettle 10.

It should be noted that that the structure of the mechanical property detection device 100 and the beneficial effects produced have been illustrated in detail in embodiment 1, and will not be repeated redundantly herein.

It should be supplemented that the working principle of the microscope, the working principle of the refrigerator 31, the working principle of the gas cylinder 40, and the working principle of the sensor belong to conventional means, and do not belong to improvement points of the present disclosure.

The present embodiment provides a use method based on a mechanical property detection device, wherein when the detection device is practically used, following steps are included:

Preparation work: repeatedly cleaning the interior of the reaction kettle 10, and the reaction platform 11, the reaction frame 12 and so on with distilled water, and then drying the same, after the cleaning is completed and the moisture is evaporated, connecting pipelines, sealing the reaction kettle 10, and after introducing methane gas, inspecting the pipelines for airtightness.

Temperature adjustment work: injecting a circulating liquid into a thermotank of a refrigerator 31, starting the refrigerator 31, and adjusting temperature of the refrigerator 31 to −5° C.

Adding material: after the temperature in the reaction kettle 10 reaches experimental requirements, adding a certain volume of distilled water to the reaction frame 12, and then sealing the reaction kettle 10.

Pressure adjustment work: filling methane gas into the reaction kettle 10, and when the pressure in the reaction kettle 10 reaches 5 MPa, closing an inflation valve and opening an exhaust valve to reduce the pressure to atmospheric pressure, then closing the exhaust valve and opening the inflation valve to increase the pressure to the pressure condition required in the experiment.

Temperature rising work: increasing the temperature in the reaction kettle 10 at a heating rate of 1° C./min until the temperature reaches the temperature required for the experiment.

Observation work: making observation through a microscope system 200 in real time, and recording growth morphology of hydrate.

Test work: after the experiment time reaches set time, testing an adhesive force value of the hydrate by a force measuring mechanism and recoding the adhesive force value.

The steps are repeated several times to obtain the adhesive force obtained under the same condition, and an average value is the final adhesive force of the hydrate on the wall surface.

Finally, it should be indicated that the various embodiments above are merely used for illustrating the technical solutions of the present disclosure, rather than limiting the present disclosure. While the detailed description is made to the present disclosure with reference to the various preceding embodiments, those ordinarily skilled in the art should understand that they still could modify the technical solutions recited in the various preceding embodiments, or make equivalent substitutions to some or all of the technical features therein. These modifications or substitutions do not make the essence of the corresponding technical solutions depart from the scope of the technical solutions of the various embodiments of the present disclosure.

INDUSTRIAL APPLICABILITY

The embodiments of the present disclosure provide a mechanical property detection device and a use method thereof and a force detection system. The mechanical property detection device includes a reaction kettle, a thrust mechanism, and a force detection sensor; a reaction platform and a reaction frame provided on the reaction platform is provided in the reaction kettle, an end of the thrust mechanism extends into the reaction kettle and can push the reaction frame to move relative to the reaction platform, and the force detection sensor is configured to detect magnitude of a thrust of the thrust mechanism when pushing the reaction frame. The magnitude of thrust applied by the thrust mechanism to the reaction frame is tested by the force detection sensor, further the magnitude of adhesive force of the gas hydrate adhering to the reaction platform during the pushing process is obtained, thus testing of adhesive force of the gas hydrate is realized, meanwhile, the evaluation on the action effect of an inhibitor of the hydrate is realized, and thus the screening of inhibitor is guided.

In addition, it may be understood that the mechanical property detection device and the use method thereof and the force detection system in the present disclosure may be reproduced, and may be used in a variety of industrial applications. For example, the mechanical property detection device and the use method thereof and the force detection system in the present disclosure may be used in hydrate experiment equipment for any application of mechanical property detection.

What is claimed is:

1. A mechanical property detection device, comprising a reaction kettle, a thrust mechanism, and a force detection sensor, wherein
   a reaction platform and a reaction frame arranged on the reaction platform are provided in the reaction kettle, an end of the thrust mechanism extends into the reaction kettle, and is capable of pushing the reaction frame to move relatively to the reaction platform; and the force detection sensor is configured to detect magnitude of a thrust of the thrust mechanism when pushing the reaction frame,
   wherein the thrust mechanism comprises a drive assembly, a push rod, and a push plate fixedly connected to the push rod; and
   the force detection sensor is provided on the push rod, and a power output end of the drive assembly is connected to the push rod, so as to push the push rod to move, the push rod drives the push plate to move synchronously, and a side of the push plate away from the push rod is capable of abutting against the reaction frame,
   wherein a plurality of reaction frames are provided on the reaction platform, the plurality of reaction frames are arranged in a step shape along a length direction of the reaction platform, and a plurality of step-shaped push portions are arranged on a side surface of the push plate facing the reaction frames, wherein each push portion is corresponding to one reaction frame, and an interval between any two adjacent push portions is greater than length or width of a single reaction frame.

2. The mechanical property detection device according to claim 1, wherein the reaction kettle comprises a cylindrical side wall, a lower cover covering a lower end of the cylindrical side wall, and an upper cover covering an upper end of the cylindrical side wall, and the reaction platform is fixedly provided in an inner cavity of the reaction kettle.

3. The mechanical property detection device according to claim 1, wherein the drive assembly comprises a hand wheel, a screw rod, and a fixing block sleeved on the screw rod, wherein
   an end of the push rod away from the push plate is fixedly connected to the fixing block, and the hand wheel is fixedly connected to an end of the screw rod away from the push rod, and
   the screw rod is capable of being driven to rotate in synchronization by rotating the hand wheel, so that the fixing block is capable of reciprocating along a length direction of the screw rod.

4. The mechanical property detection device according to claim 3, wherein a blind hole is provided at an end of the push rod facing the screw rod, and when the push rod moves towards an end close to the screw rod, an end portion of the screw rod extends into the blind hole.

5. The mechanical property detection device according to claim 3, wherein the drive assembly further comprises a positioning rod and a positioning plate,
   wherein an end of the positioning rod is fixedly connected to the reaction kettle, the positioning rod is slidingly fitted with the positioning plate, and the fixing block is fixedly provided on the positioning plate.

6. The mechanical property detection device according to claim 5, wherein one side surface of the positioning plate facing the hand wheel is fixedly connected to an end surface of the fixing block, and the push rod is fixedly connected to the other side surface of the positioning plate.

7. The mechanical property detection device according to claim 5, wherein the positioning rod is provided in parallel with the screw rod, and when the positioning plate is quadrangular, four positioning rods are provided, and the four positioning rods are respectively connected to four corners of the positioning plate.

8. The mechanical property detection device according to claim 5, wherein the fixing block is provided in a step shape, and an end of the push rod connected to the positioning plate is provided in a step shape.

9. The mechanical property detection device according to claim 5, wherein the drive assembly further comprises a fixing plate, wherein the fixing plate and the positioning plate are parallel to each other, and the other end of the positioning rod is fixedly connected to the fixing plate, and the screw rod passes through the fixing plate and is rotatably connected to the fixing plate.

10. The mechanical property detection device according to claim 1, wherein the number of the reaction frame is at least one, the push plate has at least one push portion, and each of the at least one reaction frame corresponds to one push portion.

11. The mechanical property detection device according to claim 1, wherein the reaction kettle has a visual window configured to observe the reaction frame, and a glass plate is provided at the visual window.

12. The mechanical property detection device according to claim 1, wherein the reaction kettle has an interlayer cavity, the interlayer cavity has a circulating liquid inlet and a circulating liquid outlet, the circulating liquid inlet and the circulating liquid outlet are respectively connected to a circulating liquid conduit, and the circulating liquid conduit is configured to communicate with a refrigerator.

13. The mechanical property detection device according to claim 1, further comprising a pressure sensor configured to detect a pressure within the reaction kettle, wherein the pressure sensor is provided on an inner bottom surface of the reaction kettle; and further comprising a temperature sensor configured to detect a temperature within the reaction kettle, wherein the temperature sensor is provided on an inner side wall of the reaction kettle.

14. The mechanical property detection device according to claim 13, wherein the pressure sensor and the temperature sensor are respectively connected to a detection secondary instrument, and the detection secondary instrument is configured to be electrically connected to an external computer.

15. The mechanical property detection device according to claim 1, wherein the reaction kettle has an injection port configured to fill a gas.

16. A force detection system, comprising the mechanical property detection device according to claim 1, and further comprising a microscope system, wherein an observation port of the microscope system faces the visual window of the reaction kettle, so as to observe changes of hydrate in the reaction kettle.

17. The force detection system according to claim 16, wherein the microscope system comprises a computer, a CCD image sensor, a zoom lens, an LED intense light source, and a light source control box, wherein the CCD image sensor is connected to the zoom lens, the other end of the image sensor is connected to the computer through a data line, and is configured to observe growth morphology of gas hydrate, and the LED intense light source is fixed at a front end of the zoom lens, and is configured to provide a light source for the reaction kettle.

18. A use method based on the mechanical property detection device according to claim 1, comprising following steps:

preparation work: cleaning the reaction platform and the reaction frame inside the reaction kettle several times with distilled water, after the cleaning is completed and moisture is evaporated, connecting pipelines, sealing the reaction kettle, and after introducing methane gas, inspecting the pipelines for airtightness;

temperature adjustment work: injecting a circulating liquid into a thermotank of a refrigerator, starting the refrigerator, and adjusting temperature of the refrigerator to −5° C.;

adding material: after a temperature in the reaction kettle reaches experimental requirements, adding a certain volume of distilled water to the reaction frame, and then sealing the reaction kettle;

pressure adjustment work: filling methane gas into the reaction kettle, and when pressure in the reaction kettle reaches 5 MPa, closing an inflation valve and opening an exhaust valve to reduce the pressure to atmospheric pressure; then closing the exhaust valve and opening the inflation valve to increase the pressure to pressure required in the experiment;

temperature rising work: increasing the temperature in the reaction kettle at a heating rate of 1 °C/min until the temperature reaches a temperature required for the experiment;

observation work: making observation through a microscope system in real time, and recording growth morphology of hydrate; and test work: after experiment time reaches set time, testing an adhesive force value of the hydrate by a force measuring mechanism and recoding the adhesive force value, wherein the steps are repeated several times to obtain adhesive force obtained under the same condition, and an average value is a final adhesive force of the hydrate on a wall surface.

* * * * *